(12) United States Patent
Ohtaki et al.

(10) Patent No.: US 7,760,070 B2
(45) Date of Patent: Jul. 20, 2010

(54) VEHICLE SECURITY DEVICE AND SYSTEM

(75) Inventors: Kiyokazu Ohtaki, Aichi (JP); Yoshihisa Hirano, Aichi (JP); Jun Tanaka, Aichi (JP); Masaki Hayashi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 1122 days.

(21) Appl. No.: 11/409,666

(22) Filed: Apr. 24, 2006

(65) Prior Publication Data

US 2006/0238300 A1 Oct. 26, 2006

(30) Foreign Application Priority Data

Apr. 25, 2005 (JP) ............................. 2005-126930

(51) Int. Cl.
*G06K 9/00* (2006.01)

(52) U.S. Cl. .................. 340/5.53; 340/5.72; 340/426.1; 382/104; 348/148

(58) Field of Classification Search ................ 340/5.53, 340/5.83, 5.72, 426.1, 426.11, 576, 573.7; 307/10.2, 10.3; 382/115, 118; 180/286, 180/287; 348/156, 148
See application file for complete search history.

(56) References Cited

U.S. PATENT DOCUMENTS

| 5,557,254 | A | * | 9/1996 | Johnson et al. | ........ 340/426.19 |
| 5,812,067 | A | * | 9/1998 | Bergholz et al. | ........... 340/5.52 |
| 6,954,138 | B1 | * | 10/2005 | Sugiura | ................ 340/426.24 |
| 2002/0097145 | A1 | | 7/2002 | Tumey et al. | |
| 2002/0110261 | A1 | * | 8/2002 | Yanai | ......................... 382/104 |
| 2003/0212480 | A1 | | 11/2003 | Lutter et al. | |
| 2004/0075540 | A1 | * | 4/2004 | Yasui | ...................... 340/426.1 |
| 2004/0234109 | A1 | | 11/2004 | Lemelson et al. | |

FOREIGN PATENT DOCUMENTS

| JP | 2001-063525 | 3/2001 |
| JP | 2004-108196 | 4/2004 |
| JP | 2004-276783 | 10/2004 |
| JP | 2004-314906 | 11/2004 |

* cited by examiner

*Primary Examiner*—Edwin C Holloway, III
(74) *Attorney, Agent, or Firm*—Patterson Thuente Christensen & Pedersen, P.A.

(57) ABSTRACT

A vehicle security device for providing a vehicle with improved security. The security device includes a camera for generating a facial image of a vehicle occupant. A security controller, which is connected to the camera, restricts driving of the vehicle. If the facial image includes the necessary facial features, the security controller enables the driving of the vehicle.

19 Claims, 2 Drawing Sheets

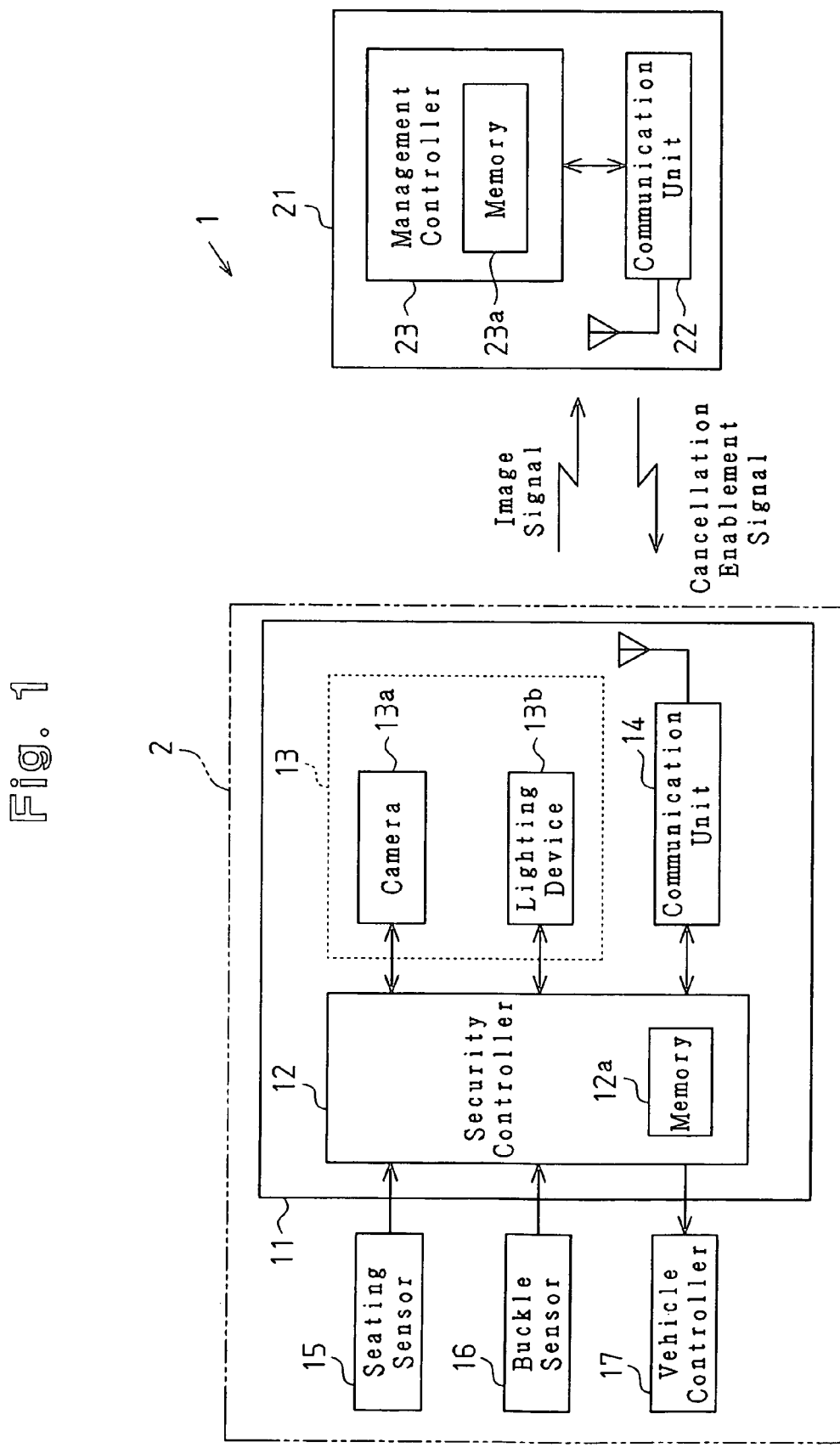

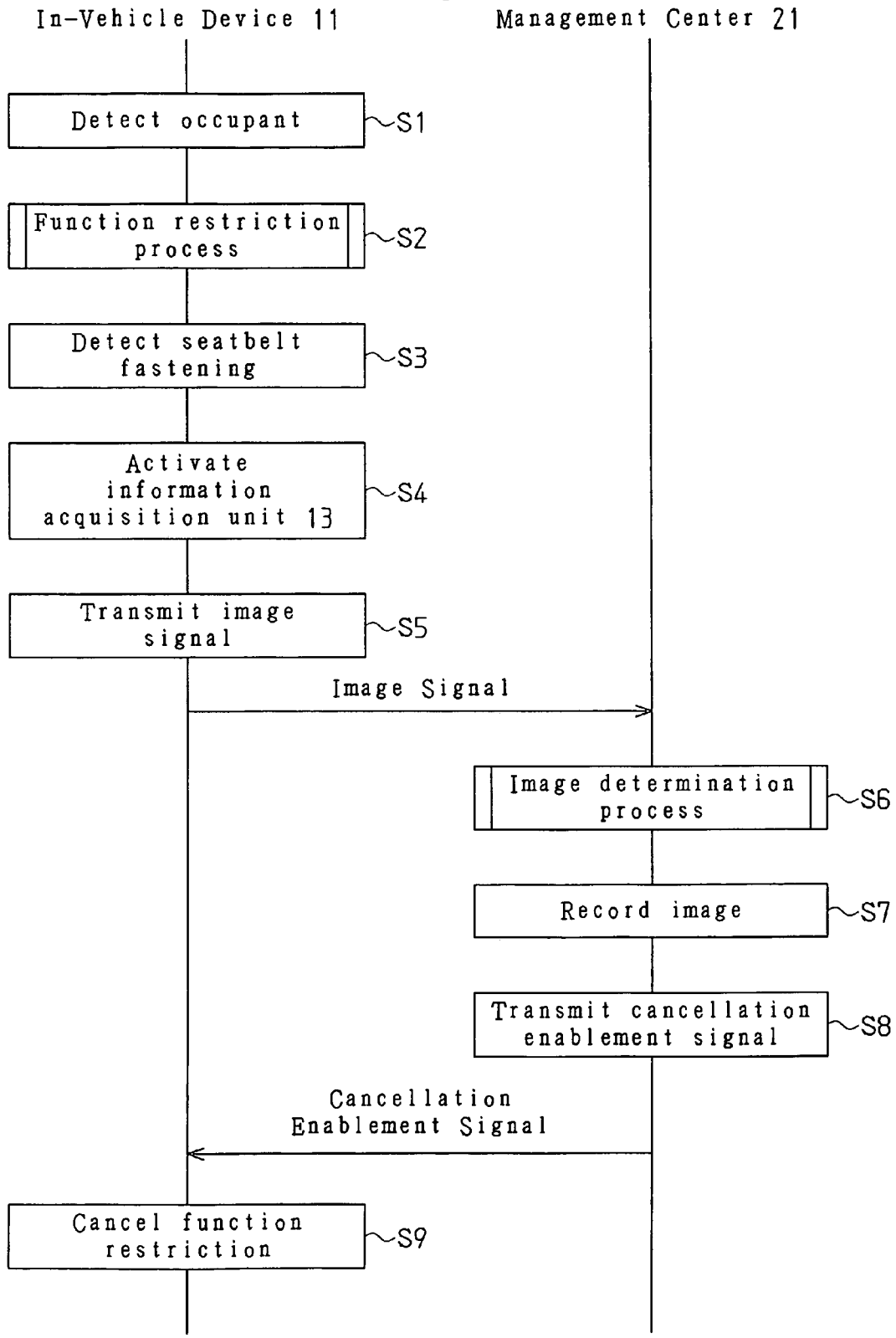

VEHICLE SECURITY DEVICE AND SYSTEM

BACKGROUND OF THE INVENTION

The present invention relates to a vehicle security device and vehicle security system for deterring unauthorized use of a vehicle by a third party and theft of a vehicle.

Japanese Laid-Open Patent Publication No. 2004-108196 describes an example of a vehicle security apparatus that improves the security of a vehicle. The vehicle security apparatus includes a portable device, which is held by an owner (user) of the vehicle, and an in-vehicle device, which is installed in the vehicle. The portable device and the in-vehicle device communicate with each other. More specifically, the in-vehicle device periodically transmits a wireless signal (request signal) to the passenger compartment. When receiving the request signal, the portable device returns a wireless signal (ID code signal) to the in-vehicle device. The ID code signal includes a predetermined ID code. The in-vehicle device then compares the ID code included in the ID code signal with an ID code preset for the in-vehicle device. When the ID codes match, the in-vehicle device enables the engine to be started.

The vehicle security device includes an emergency key to enable starting of the engine when battery drainage occurs in the portable device. The emergency key is formed by a mechanical key, which is insertable into a key cylinder located in the passenger compartment, and a transponder, which is incorporated in the mechanical key and activated by electromagnetic force to transmit a wireless signal (transponder signal) including a unique transponder code.

In a normal state, rotation of the key cylinder is disabled. The key cylinder includes an antenna from which electromagnetic energy is generated. When the mechanical key is inserted in the key cylinder, the key cylinder generates electromagnetic energy in a small area proximal to the key cylinder. The electromagnetic energy activates the transponder and transmits the transponder signal. Upon receipt of the transponder signal, the in-vehicle device compares the transponder code included in the transponder signal with a transponder code preset for the in-vehicle device. When the transponder codes match, the in-vehicle device enables the key cylinder to be rotated. This prevents the engine from being started even if the mechanical key is duplicated or if a foreign object is inserted into the key cylinder. As a result, the security of the vehicle is improved.

Although such a conventional vehicle security apparatus improves the security of a vehicle, theft of the portable device cannot be prevented. Accordingly, it is desirable that the security function of the vehicle security apparatus be improved.

SUMMARY OF THE INVENTION

The present invention provides a vehicle security apparatus and a vehicle security system that improves the security of a vehicle.

One aspect of the present invention is a vehicle security device for providing security for a vehicle used to transport an occupant. The vehicle security device includes an information acquisition unit for acquiring physical information about a vehicle occupant. A drive restriction unit, connected to the information acquisition unit, restricts driving of the vehicle. The drive restriction unit enables driving of the vehicle when the physical information acquired by the information acquisition unit is usable.

A further aspect of the present invention is a vehicle security system for providing security for a vehicle used to transport an occupant. The vehicle security system includes an in-vehicle device, installed in the vehicle, for restricting driving of the vehicle. The in-vehicle device includes an information acquisition unit for acquiring physical information about a vehicle occupant. A drive restriction unit, connected to the information acquisition unit, restricting driving of the vehicle and transmits the physical information out of the in-vehicle device. The drive restriction unit enables driving of the vehicle when the physical information acquired by the information acquisition unit is usable. The vehicle security system further includes a vehicle management device, communicable with the in-vehicle device, for receiving the physical information transmitted from the in-vehicle device. The vehicle management device includes a management controller for determining whether or not the physical information is usable and for transmitting to the in-vehicle device an enablement signal for enabling driving of the vehicle when determining that the physical information is usable. The drive restriction unit of the in-vehicle device enables driving of the vehicle in response to the enablement signal. A management controller memory for use by the management controller records the physical information when the physical information is usable.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a schematic block diagram showing a vehicle security system according to a preferred embodiment of the present invention; and FIG. 2 is a flowchart showing the operation of the vehicle security system.

DETAILED DESCRIPTION OF THE PREFERRED EMBODIMENTS

A preferred embodiment of the present invention will now be discussed with reference to FIGS. 1 and 2.

Referring to FIG. 1, a vehicle security system 1 includes an in-vehicle device 11 (vehicle security device) and a management center 21 (vehicle management device). The in-vehicle device 11 is installed in a vehicle 2, and the management center 21 is located outside the vehicle 2.

The in-vehicle device 11 includes a security controller 12 (drive restriction unit), an information acquisition unit 13, and a communication unit 14.

The information acquisition unit 13, which is arranged in the passenger compartment of the vehicle 2, includes a camera 13a and a lighting device 13b. The camera 13a monitors the vehicle occupant seated in the driver seat. The lighting device 13b illuminates the vehicle occupant's face. The camera 13a and the lighting device 13b, which are electrically connected to the security controller 12, are activated in response to an activation signal output from the security controller 12. When receiving the activation signal, the camera 13a generates image data of the face of the vehicle occupant seated in the driver seat and sends the facial image data (physical information) to the security controller 12. The activation signal also illuminates the vehicle occupant's face with the lighting device 13*b*. The brightness for the illumination with the lighting device 13*b* may be varied in accordance with the brightness of the surrounding environment.

The security controller 12 includes a CPU, a ROM, a RAM (none shown), and a non-volatile memory 12*a*. Further, the security controller 12 is electrically connected to a seating sensor 15, a buckle sensor 16, and a vehicle controller 17. The seating sensor 15 detects the seating of a vehicle occupant in the driver seat. The buckle sensor 16 detects the fastening of a driver seatbelt. The vehicle controller 17 controls the driving functions of the vehicle 2.

The security controller 12 sends a function restriction signal to the vehicle controller 17 when receiving a detection signal from the seating sensor 15 indicating that a vehicle occupant is seated in the driver seat. Further, the security controller 12 sends the activation signal to the camera 13*a* and the lighting device 13*b* when receiving a detection signal from the buckle sensor 16 indicating that the driver seatbelt has been fastened. When facial image data is received from the camera 13*a*, the security controller 12 temporarily records the image data in a buffer and sends the image data to the communication unit 14.

The communication unit 14 modulates the facial image data output from the security controller 12 to a radio wave signal having a predetermined frequency and transmits the modulated image signal out of the vehicle 2. A cancellation enablement signal transmitted from the management center 21 is receivable by the communication unit 14. When receiving the cancellation enablement signal, the communication unit 14 demodulates the cancellation enablement signal to a pulse signal and sends the pulse signal to the security controller 12.

When receiving the cancellation enablement signal, which is encoded, from the communication unit 14, the security controller 12 decodes the cancellation enablement signal. If the security controller 12 determines that the cancellation enablement signal is a proper signal, the security controller 12 further records the facial image data, which is temporarily stored in the buffer, in the memory 12*a* and sends a restriction cancellation signal to the vehicle controller 17.

The vehicle controller 17 includes a CPU, a ROM, and a RAM (none shown) and controls the driving functions of the vehicle 2. The vehicle controller 17 executes, for example, electric system switch control and engine drive control when controlling the driving functions of the vehicle 2. The electric system switch control switches electric systems that can be activated and is executed based on functional positions ("OFF," "accessory (ACC)," "ignition (IG) ON," and "starter (ST) ON") that are set by the vehicle occupant. The vehicle controller 17 restricts the driving functions of the vehicle 2 when receiving the function restriction signal from the security controller 12 and cancels the driving function restriction when receiving the restriction cancellation signal from the security controller 12. Thus, when the seating sensor 15 detects the seating of a vehicle occupant in the driver seat, the vehicle controller 17 restrict the driving functions of the vehicle 2 until receiving the restriction cancellation signal from the security controller 12. In a state in which driving functions are restricted, for example, the starting of the engine is disabled, the maximum velocity of the vehicle 2 is restricted, the engine speed is restricted, the shifting of a gearshift lever is disabled or restricted, and the unlocking of the steering wheel is disabled.

The management center 21 includes a communication unit 22, which is communicable with the communication unit 14 of the in-vehicle device 11. The management center 21 also includes a management controller 23.

When receiving the image signal transmitted from the vehicle 2, the communication unit 22 demodulates the image signal to a pulse signal and sends the pulse signal to the management controller 23. Further, when receiving a cancellation enablement signal from the management controller 23, the communication unit 22 modulates the cancellation enablement signal to a radio wave signal having a predetermined frequency. The communication unit 22 then transmits the modulated cancellation enablement signal out of the management center 21.

The management controller 23 includes a CPU, a ROM, a RAM (none shown), and a non-volatile memory 23*a*. When receiving the image signal from the communication unit 22, the management controller 23 determines whether the facial image data included in the image signal has a deficiency. Accordingly, the management controller 23 functions as a determination means. More specifically, the management controller 23 determines whether predetermined feature conditions are satisfied. If the feature conditions are satisfied, the management controller 23 determines that the image data is usable. The feature conditions, which are reference conditions enabling identification of a person based on the facial image data, include the clearness of the facial image and the distinctiveness of facial parts, such as the eyes, nose, and mouth. Thus, the feature conditions may be used to determine whether the vehicle occupant seated in the driver seat is masked, wearing sunglasses, or facing forward.

The management controller 23 determines that the facial image data is usable when the feature conditions are satisfied, that is, when the vehicle occupant is neither masked nor wearing sunglasses and facing forward so that his or her face is exposed, or not hidden. In such a case, the management controller 23 encodes the cancellation enablement signal and sends it to the communication unit 22 while recording the facial image data in the memory 23*a*. When determining that the facial image data does not satisfy the feature conditions because the vehicle occupant's face is hidden, that is, when the vehicle occupant is masked, wearing sunglasses, or not facing forward, the management controller 23 disables the output of the cancellation enablement signal.

The operation of the vehicle security system 1 will now be discussed with reference to the flowchart of FIG. 2.

In step S1, if the seating sensor 15 detects that a vehicle occupant is seated in the driver seat, the in-vehicle device 11 proceeds to step S2 and has the security controller 12 perform a function restriction process. More specifically, when receiving a detection signal indicating the seating of a vehicle occupant from the seating sensor 15, the security controller 12 sends a function restriction signal to the vehicle controller 17. In this state, the vehicle controller 17 disables normal driving of the vehicle 2 regardless of how the vehicle 2 is operated.

Subsequently, in step S3, if the buckle sensor 16 detects the fastening of the driver seatbelt, in step S4, the security controller 12 activates the information acquisition unit 13 (i.e., the camera 13*a* and the lighting device 13*b*) with an activation signal. Then, in step S5, the image signal, which includes the facial image data generated by the camera 13*a*, is transmitted to the management center 21.

In step S6, when the communication unit 22 receives the image signal from the in-vehicle device 11, the management center 21 performs an image determination process with the management controller 23. When the management controller 23 determines that the facial image data satisfies the feature conditions, in step S7, the management controller 23 records the image data to the memory 23a. Further, in step S8, the management controller 23 sends the cancellation enablement signal from the management center 21 to the in-vehicle device 11.

In step S9, when the communication unit 14 of the in-vehicle device 11 receives the cancellation enablement signal, the security controller 12 sends the restriction cancellation signal to the vehicle controller 17. This cancels the state in which the driving functions of the vehicle 2 are restricted.

The above operations are performed whenever a state in which the seating of a vehicle occupant in the driver seat is not detected shifts to a state in which the seating of a vehicle occupant in the driver seat is detected. In other words, communication is performed between the in-vehicle device 11 and the management center 21 whenever a vehicle occupant sits on the driver seat.

The preferred embodiment has the advantages described below.

(1) When the seating sensor 15 detects that a vehicle occupant has been seated in the vehicle 2, the security controller 12 sends a function restriction signal to the vehicle controller 17 to restrict the driving functions of the vehicle 2. Then, when the seatbelt of the driver seat is fastened, the security controller 12 acquires a facial image of the vehicle occupant with the camera 13a and transmits the acquired facial image to the management center 21. The management controller 23 of the management center 21 determines whether or not the facial image is usable. When determining that the facial image is usable, the management center 21 sends the cancellation enablement signal to the in-vehicle device 11, while recording the facial image to the memory 23a.

When the communication unit 14 of the in-vehicle device 11 receives the cancellation enablement signal, the security controller 12 sends the restriction cancellation signal to the vehicle controller 17 to cancel the driving function restriction of the vehicle 2. The security controller 12 also records the facial image to the memory 12a. If the communication unit 14 cannot receive the cancellation enablement signal, the security controller 12 continues to keep the vehicle 2 in a state in which the driving functions are restricted. Thus, the vehicle occupant cannot drive the vehicle 2 in a normal manner unless the camera 13a generates a facial image of the vehicle occupant and the management center 21 determines that the facial image is usable. In addition, the facial image is recorded in the memory 12a of the in-vehicle device 11 and the memory 23a of the management center 21. This would deter a third person (a person who is not authorized to use the vehicle 2) from stealing the vehicle 2 or using the vehicle 2 in an unauthorized manner since the facial image of such a person would be recorded in the in-vehicle device 11 and the management center 21. Furthermore, even if a third person steals the key of the vehicle 2 or the portable device from the user, the driving functions of the vehicle 2 would still be restricted. This would deter the third person from stealing the key or portable device. As a result, the security of the vehicle 2 is improved, and the safety of the user is improved.

(2) The information acquisition unit 13 is activated when the seating of a vehicle occupant in the driver seat and the fastening of the driver seatbelt are detected. Thus, the information acquisition unit 13 is activated only when a vehicle occupant tries to drive the vehicle 2. Accordingly, the information acquisition unit 13 is activated only when necessary. This prevents unnecessary power consumption in the vehicle 2.

(3) To drive the vehicle 2, the seatbelt of the driver seat must be fastened. This prevents the vehicle occupant, or driver, from forgetting to fasten the seatbelt and ensures the safety of the vehicle occupant.

(4) The facial image generated by the camera 13a is recorded to the memory 23a of the management center 21, which is located outside the vehicle 2. Thus, even if a third person removes the in-vehicle device 11 from the vehicle 2 after stealing the vehicle 2 or using the vehicle 2 in an unauthorized manner, the recording of the facial image cannot be eliminated. Thus, a third person would not be able to destroy evidence.

It should be apparent to those skilled in the art that the present invention may be embodied in many other specific forms without departing from the spirit or scope of the invention. Particularly, it should be understood that the present invention may be embodied in the following forms.

The information acquisition unit 13 may include more than one camera 13a in the passenger compartment to generate facial image data of the vehicle occupant from different angles. This would enable determination of whether the facial image of the vehicle occupant is usable in a three-dimensional manner. As a result, a third person would not be able to use, for example, a photograph of the user to cancel the driving function restriction of the vehicle 2. Thus, the security of the vehicle 2 would further be improved.

Instead of the facial image of the vehicle occupant, the information acquisition unit 13 may acquire for example, fingerprints, voiceprints, or eye irises as the physical information. In such a case, the information acquisition unit 13 includes a device that acquires such information in lieu of the camera 13a. Alternatively, the in-vehicle device 11 may acquire physical information related with fingerprints, voiceprints, or eye irises in addition to the facial image.

In the preferred embodiment, the security controller 12 activates the information acquisition unit 13 under the condition that the seatbelt of the driver seat is fastened. Instead, the security controller 12 may activate the information acquisition unit 13 under the condition that an operation to prepare for the driving of the vehicle 2 has been performed. Such an operation may be one of, for example, the starting of the engine, the depression of the brake pedal, the release of a parking brake, the opening and closing of a door, the switching of the functional position that determines the electric system of the vehicle 2 that is to be activated, the insertion of a key in a key receptacle located in the vehicle 2, and the shifting of a gearshift lever from a non-driving position to a driving position. In such a case, the timing for sending the function restriction signal to the vehicle controller 17 from the security controller 12 is varied accordingly.

The condition for activating the information acquisition unit 13 does not have to include the fastening of the seatbelt of the driver seat. The information acquisition unit 13 may be activated under the condition that only the seating of a vehicle occupant in the driver seat has been detected.

In the preferred embodiment, the vehicle security system 1 performs the function restriction process and the function restriction cancellation process whenever the seating of a vehicle occupant is detected by the seating sensor 15. However, the vehicle security system 1 does not necessarily have to perform such processes whenever the seating sensor 15 detects the seating of a vehicle occupant. For example, when the engine is being driven, the vehicle security system 1 may refrain from performing the above processes.

The facial image does not necessarily have to be recorded to the memory 12a of the in-vehicle device 11.

The information acquisition unit 13 does not necessarily have to be provided with the lighting device 13b. That is, the information acquisition unit 13 may include only the camera 13a.

In the preferred embodiment, the vehicle security system 1 includes the in-vehicle device 11 and the management center 21. The in-vehicle device 11 and the management center 21 communicate with each other to cancel the driving function restriction of the vehicle 2. However, the management center 21 may be eliminated, and the driving function restriction and driving function restriction cancellation of the vehicle 2 may be performed only by the in-vehicle device 11. In such a case, for example, the in-vehicle device 11 first restricts the driving function of the vehicle 2 when the seating sensor 15 detects the seating of a vehicle occupant. Then, when the buckle sensor 16 detects the fastening of the seatbelt, the in-vehicle device 11 activates the information acquisition unit 13, and the security controller 12 determines whether the image generated by the camera 13a is usable. In this case, the security controller 12 functions as a determination means. The security controller 12 records the image to the memory 12a and sends the restriction cancellation signal to the vehicle controller 17 only when determining that the image is usable. Although this would somewhat lower the security level in comparison with the preferred embodiment, the safety of the user and the security of the vehicle 2 would still be improved. Further, the communication unit 14 and the management center 21 would become unnecessary.

The present examples and embodiments are to be considered as illustrative and not restrictive, and the invention is not to be limited to the details given herein, but may be modified within the scope and equivalence of the appended claims.

What is claimed is:

1. A vehicle security device for deterring unauthorized use of a vehicle by acquiring physical information of a vehicle occupant, the vehicle security device comprising: an information acquisition unit for acquiring physical information about a vehicle occupant; a drive restriction unit, connected to the information acquisition unit, for restricting driving of the vehicle, and the drive restriction unit enabling driving of the vehicle by the vehicle occupant, regardless of whether the vehicle occupant is a person authorized to drive the vehicle, when the physical information acquired by the information acquisition unit is usable; a seating sensor, connected to the drive restriction unit, for detecting seating of a vehicle occupant in a seat; and
    a buckle sensor, connected to the drive restriction unit, for detecting fastening of a seatbelt by the vehicle occupant, wherein the drive restriction unit activates the information acquisition unit and acquires the physical information when the buckle sensor detects the fastening of the seatbelt after the seating sensor detects the seating of a vehicle occupant.

2. The vehicle security device according to claim 1, further comprising: a determination means for determining whether or not the physical information is usable, the drive restriction unit enabling driving of the vehicle regardless of whether the vehicle occupant is a person authorized to drive the vehicle when the determination means determines that the physical information is usable.

3. The vehicle security device according to claim 1, wherein after the seating sensor detects the seating of a vehicle occupant, the drive restriction unit activates the information acquisition unit and acquires the physical information when the vehicle occupant fastens a seatbelt, the engine is started, a gearshift lever is shifted from a non-driving position to a driving position, a brake pedal is depressed, a parking brake is released, a door is opened and closed, a functional position for determining the electric system of the vehicle that is to be activated is switched, or a key is inserted in a key receptacle located in the vehicle.

4. The vehicle security device according to claim 1, wherein the drive restriction unit includes a memory for recording the physical information.

5. The vehicle security device according to claim 1, wherein the information acquisition unit includes a camera for acquiring the physical information about the vehicle occupant.

6. The vehicle security device according to claim 5, wherein the information acquisition unit includes a lighting device for illuminating the vehicle occupant.

7. The vehicle security device according to claim 5, wherein the camera acquires facial image data indicating facial features of the vehicle occupant as the physical information, and the camera acquires the facial image data as the usable physical information when the vehicle occupant is facing forward and the vehicle occupant's face is exposed.

8. The vehicle security device according to claim 7, wherein the drive restriction unit includes a memory for recording the physical information, and the drive restriction unit determines whether the physical information is usable and records usable physical information in the memory.

9. A vehicle security system for deterring unauthorized use of a vehicle by acquiring physical information of a vehicle occupant, the vehicle security system comprising:
    an in-vehicle device, installed in the vehicle, for restricting driving of the vehicle, the in-vehicle device including:
    an information acquisition unit for acquiring physical information about a vehicle occupant;
    a drive restriction unit, connected to the information acquisition unit, for restricting driving of the vehicle and transmitting the physical information out of the in-vehicle device, with the drive restriction unit enabling driving of the vehicle when the physical information acquired by the information acquisition unit comprises usable physical information;
    a seating sensor, connected to the drive restriction unit, for detecting seating of the vehicle occupant in a seat; and
    a buckle sensor, connected to the drive restriction unit, for detecting fastening of a seatbelt by the vehicle occupant; and
    a vehicle management device outside of the vehicle, communicable with the in-vehicle device, for receiving the physical information transmitted from the in-vehicle device, the vehicle management device including:
    a management controller for determining whether the physical information comprises usable physical information and for transmitting to the in-vehicle device an enablement signal for enabling driving of the vehicle when determining that the physical information comprises usable physical information, regardless of whether the vehicle occupant is a person authorized to drive the vehicle, wherein the drive restriction unit of the in-vehicle device enables driving of the vehicle in response to the enablement signal; and
    a management controller memory for use by the management controller to record the physical information when the physical information comprises usable physical information;
    wherein the drive restriction unit of the in-vehicle device activates the information acquisition unit and acquires the physical information when the buckle sensor detects the fastening of the seatbelt after the seating sensor detects the seating of the vehicle occupant.

10. The vehicle security system according to claim 9, further comprising: a communication unit, connected to the drive restriction unit, for transmitting the physical information to the vehicle management device and receiving the enablement signal from the vehicle management device.

11. The vehicle security system according to claim 9, wherein after the seating sensor detects the seating of the vehicle occupant, the drive restriction unit activates the information acquisition unit and acquires the physical information when the vehicle occupant fastens a seatbelt, the engine is started, a gearshift lever is shifted from a non-driving position to a driving position, a brake pedal is depressed, a parking brake is released, a door is opened and closed, a functional position for determining the electric system of the vehicle that is to be activated is switched, or a key is inserted in a key receptacle located in the vehicle.

12. The vehicle security system according to claim 9, wherein the drive restriction unit includes a drive restriction unit memory for recording the usable physical information.

13. The vehicle security system according to claim 9, wherein the information acquisition unit includes a camera for acquiring the physical information about the vehicle occupant.

14. The vehicle security system according to claim 13, wherein the information acquisition unit includes a lighting device for illuminating the vehicle occupant.

15. The vehicle security system according to claim 13, wherein the physical information about the vehicle occupant comprises facial image data indicating facial features of the vehicle occupant, and the facial image data comprises usable physical information when the vehicle occupant is facing forward and the vehicle occupant's face is exposed.

16. The vehicle security system according to claim 15, wherein the drive restriction unit includes a drive restriction unit memory for recording the physical information, and the drive restriction unit determines whether the physical information comprises usable physical information and records the usable physical information in the memory.

17. The vehicle security system according to claim 9, wherein the physical information is selected from the group consisting of a facial image, fingerprints, voiceprints, and eye iris images.

18. The vehicle security system according to claim 9, wherein the usable physical information comprises physical information that satisfies a condition.

19. The vehicle security system according to claim 18, wherein the physical information comprises a facial image and the condition is selected from the group consisting of: the vehicle occupant is not wearing a mask, the vehicle occupant is not wearing sunglasses, and the vehicle occupant is facing forward.

* * * * *